(12) United States Patent
Albers et al.

(10) Patent No.: US 6,875,375 B2
(45) Date of Patent: Apr. 5, 2005

(54) ELECTRICALLY CONDUCTIVE THERMOPLASTIC ELASTOMER COMPOSITE

(75) Inventors: Martin Albers, Tampere (FI); Mikko Karttunen, Tampere (FI); Taisto Vilkman, Tuusula (FI)

(73) Assignee: Premix Oy, Rajamaki (FI)

( * ) Notice: Subject to any disclaimer, the term of this patent is extended or adjusted under 35 U.S.C. 154(b) by 0 days.

(21) Appl. No.: 10/806,382

(22) Filed: Mar. 23, 2004

(65) Prior Publication Data

US 2004/0178392 A1 Sep. 16, 2004

Related U.S. Application Data

(63) Continuation of application No. PCT/FI02/00757, filed on Sep. 23, 2002.

(30) Foreign Application Priority Data

Sep. 24, 2001 (FI) .............................................. 20011872

(51) Int. Cl.⁷ ............................. H01B 1/22; C08K 9/04; C08K 3/08; C08L 21/00

(52) U.S. Cl. ........................ 252/512; 252/514; 428/407
(58) Field of Search ................................. 252/512, 513, 252/514; 428/403, 407; 204/296

(56) References Cited

U.S. PATENT DOCUMENTS 5,116,638 A * 5/1992 Mino et al. .................. 427/496
5,556,524 A * 9/1996 Albers .................... 204/403.06

FOREIGN PATENT DOCUMENTS

WO        WO03028039         * 4/2003

\* cited by examiner

*Primary Examiner*—Mark Kopec
(74) *Attorney, Agent, or Firm*—Young & Thompson (57) ABSTRACT

An electrically conductive thermoplastic elastomer composite comprising an elastomer matrix and particles coated with metal as an electrically conductive filler. The electrically conductive particles are at least partly coated with a self-assembled monomolecular layer. Alternatively, the coating may comprise molecular wires that settle between the self-assembled molecules. The resistivity of the thermoplastic elastomer of the invention is low and does not substantially increase by the action of compression.

10 Claims, 5 Drawing Sheets

ELECTRICALLY CONDUCTIVE THERMOPLASTIC ELASTOMER COMPOSITE

The invention relates to an electrically conductive thermoplastic elastomer composite comprising an elastomer matrix and metal-containing particles as an electrically conductive filler.

BACKGROUND OF THE INVENTION

As to their electrical properties, polymers and polymer mixtures are usually dielectrics. However, in some applications the polymer material preferably has some electrical conductivity. Such applications include antistatic packages, containers for inflammable substances and pipework, electrostatically painted fabricated shapes, and many other applications known per se. In addition, the increasing number of electronic devices has resulted in that, on the one hand, their electronics have to be protected from electromagnetic interference caused by other electronic devices and, on the other hand, the electronic interference caused by them on the outside has to be reduced. In other words, the devices are to be EMI shielded. Electrical conductivity is often achieved by mixing metal or metal-containing particles, coal, graphite or combinations thereof in a substantially non-electrically conductive polymer acting as a matrix material.

The term elastomer refers to a material formed from macromolecules and characterized by extensibility and rapid recovery to the original shape after the tension is released. Electrically conductive elastomer composites are known wherein the matrix material is of a thermoset material, a silicone polymer, for example. Such a matrix material has to be crosslinked to achieve elastic properties, and, generally, to enable the handling of the product. Crosslinking requires much energy and time, and special crosslinking means, making the manufacture of the products slow and the production costs high. Electrically conductive thermoplastic elastomer composites are also known art. These materials can be processed rapidly and inexpensively compared with thermoplastic materials, but the resistivity values are usually higher than with thermoplastic materials.

In order for an elastomer composite to be electrically conductive, the electrically conductive particle mixed therein must be in contact with each other or the distance between them has to be small enough to allow an efficient tunnelling current to pass between them. In addition, chains leading through the matrix material have to be generated from the particles (G. R. Ruschau et al, J. Appl. Phys. 72, (1992) 953–959). The volume fraction of electrically conductive particles has to be large enough for said condition to be fulfilled. However, increasing the volume fraction deteriorates (among other things) the mechanical properties, workability and surface quality of an elastomer composite. Furthermore, the price of the material often increases significantly. Consequently, the volume fraction cannot be increased limitlessly to increase electrical conductivity.

It is known to improve the electrical conductivity of electrically conductive fillers by treating the surface of the particles in a variety of ways. An alternative is direct coating of the particles with an electrically conductive polymer. Nickel particles, for example, have been coated with polypyrrol using a method where sodium dodecyl sulphate (SDS) was first applied to the surface of the nickel particles (Genetti W. B. et al, J. Mater. Sci. 33 (1998), 3085–3093). SDS is a surface active substance and forms a double layer around the nickel particles. The pyrrol was then subjected to polymerization inside the double layer. The treatment significantly improved the specific conductivity of a particle-filled polyethylene.

However, a significant problem is associated with known electrically conductive thermoplastic elastomer composites: when subjected to compressive force, the resistivity of the composite rises greatly. For example, when the compression is about 10%, the resistivity is up to 100-fold or more compared with an uncompressed material. Naturally, this is an essential change in the characteristic of a material. According to a theory presented, the resistivity should decrease by the action of compression (G. R. Ruschau et al, J. Appl. Phys. 72, (1992) 953–959). Often in practical applications, some compression is directed to products made from said material, e.g. seals, and thus the problem is extremely common and harmful.

BRIEF DESCRIPTION OF THE INVENTION

The object of the present invention is to provide an electrically conductive thermoplastic elastomer composite having better electrical conductivity characteristics and a very low effect of compression on the electrical conductivity characteristics.

The thermoplastic elastomer composite of the invention is characterized in that the electrically conductive particles are at least partly coated with a self-assembled monomolecular layer whose molecules correspond to the general structure 1:

$$X-(CH_2)_n-CH_3 \qquad (1)$$

where X is a neutral end group capable of forming a stable complex with the metal surface.

The essential idea of the invention is that the electrically conductive particles are at least partly covered with a molecular layer that comprises long-chained molecules, forms a self-assembled monomolecular layer and acts as a passivation layer. Furthermore, the idea of a preferred embodiment is that in the general Formula 1, X is a neutral end group capable of forming a stable complex with a metal surface, such as mercaptan, 4-pyridine or phosphine. It is the idea of a second preferred embodiment that in the general Formula 1, n receives a value between 9 and 19. It is the idea of a third preferred embodiment that electrically neutral molecular wires are attached between said long-chained molecules. It is the idea of a fourth preferred embodiment that electrically conductive polymer molecules, such as polyaniline, polypyrrol or polythiophene, are attached to the self-assembled monomolecular layer.

An advantage of the invention is that the electrical conductivity of the elastomer is better than previously. The electrical conductivity does not either change essentially by the action of compression. Furthermore, an elastomer composite can be worked in many Ways with machining tools and methods generally in use in the plastics industry, such as injection moulding, extrusion or thermoforming. In spite of the good electrical conductivity, the melt viscosity of the elastomer composite of the invention is low, allowing it to be used for the manufacture of high-quality products having complicated shapes.

BRIEF DESCRIPTION OF THE FIGURES

The invention will be described in detail in the attached drawings, wherein.

DETAILED DESCRIPTION OF THE INVENTION

Figure 1:
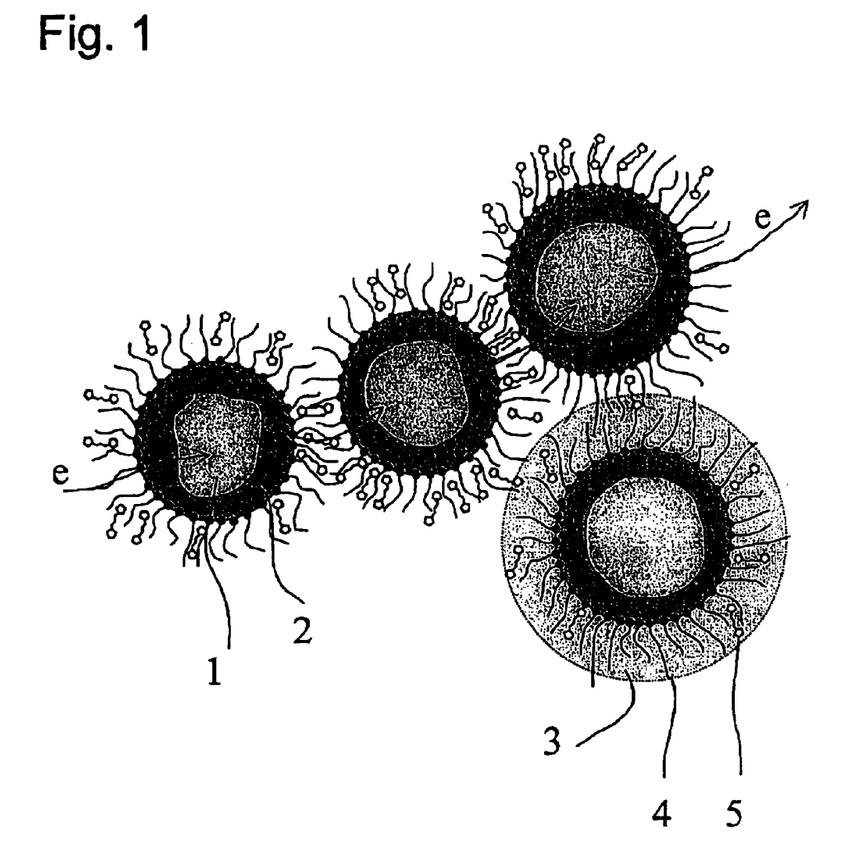
FIG. 1 schematically shows electrically conductive particles of a thermoplastic elastomer composite of the invention, FIG. 2 schematically shows the resistivities of test specimens made from electrically conductive elastomer composites of the invention and test specimens made from prior art elastomer composites as a function of the compression of the test specimen, FIG. 3 schematically shows the resistivities of second test specimens made from electrically conductive elastomer composites of the invention and test specimens made from prior art elastomer composites as a function of the compression of the test specimen.

FIG. 1 schematically shows electrically conductive particle of a thermoplastic elastomer composite of the invention. The electrically conductive thermoplastic elastomer composite of the invention comprises electrically conductive particles. Silver particles have been shown to be very suitable for electrically conductive polymer composites because of their high resistivity, thin oxide layer and metal softness (G. R. Ruschau et al, J. Appl. Phys. vol. 72, 992, 953–959). Because of the high price of silver, carrier particles made from a more inexpensive material are usually used. The carrier particle 1 may be glass, polymer or some more inexpensive metal than silver. On top of the carrier particle 1, a suitably thick silver layer 2 is coated. However, let it be pointed out that the electrically conductive metal may be other than silver, such as iron, copper, nickel, chromium, gold, platinum, palladium or the like.

The particles are further coated with a thin electrically conductive organic molecular layer 3 to substantially decrease the contact resistance of the particles and to generate some degree of interparticle attraction. According to the lengths of the molecules used in the invention, the thickness of the coating is between about 12 and 25 Å, the smallest possible contact distance between the particles then being about 10 to 35 Å, i.e. one to two molecular layer thicknesses. A molecular layer is at least partly composed of long-chained molecules 4, which form a self-assembled monomolecular layer on the surface of the metal. This layer acts as a passivation layer. In this context, passivation refers to protecting the surface from ionic charges and electrochemical processes, such as corrosion, and to a substantial lowering of the surface potential by activation of interparticle van-der-Waals attractions. Lowering the surface potential and the dielectric constant also enhance the tunnelling of electrons from one particle to another. The self-assembled molecules of the invention have the general structure of Formula 1, wherein the number of carbon atoms in a chain is at least 10 and at most 20 (n=9–19), and wherein X is a neutral end group capable of forming a complex on the surface of the metal.

(1)

Self-assembled molecules are known for example from the articles A. Ulman, Chem. Rev. 96 (1996) 1533–554 and C. D. Bain et al. J. Am Chem Soc. 111 (1989) 321–335. Self-assembled molecules suitable for very many metals, such as Au, Ag, Pd and Pt, and Cu and Fe, include alkylmercaptans and dialkyldisulphides (—S—S—). 4-pyridine, phosphines, etc., may also be assembled on metal surfaces (P. M. Allen et al., J. Electroanal. Chem. 178 (1984), 69–86). With silver particles, long-chained alkylmercaptans, such as dodecylmercaptan (DDM) or octadecylmercaptan (ODM), are generally used.

The coating of a particle may also comprise long-chained aromatic compounds, i.e. molecular wires 5, capable of anchoring between the molecules in the passivation layer and transferring electrons from one particle to another based on their own conductivity. In FIG. 1, arrows e denote the transfer of electrons from one particle to another. Electrically conductive aromatic molecules having a given predetermined length are usually called 'molecular wires' (T. S. Arrhenius et al. Proc. Natl. Acad. Sci. USA 83 (1986) 5355-, J. M. Tour, Chem. Rev. 96 (1996) 537–553.). The anchoring of molecular wires in a self-assembled monomolecular layer may substantially increase the electrical conductivity of the layer (W. M. Albers Finnish Pat. 095574 7.08.1995). It is essential that the molecular wires are neutral, i.e. they have no ionic charge, whereby no electrostatic repulsion forces are created between the particles. The molecular wires are slightly shorter than self-assembled molecules: in the examples described later, molecular wires having a length of 7 to 14 Å are used. Slightly longer molecular wires, up to about 21 Å (Finnish Patent 95574) are also applicable.

The invention will be described in detail in the following examples, where the materials and reagents used and their abbreviations are: DDM=do-decylmercaptan (Aldrich 5,799-8, >98,5%), ODM=octadecylmercaptan (Aldrich O-185-8, 98%), BTZ=benzotriazole (Aldrich 19,044-6, 97%), BPD=4,4'-bi-pyridyl (Fluka, 14455, 99%), DPE=1,2-di(4-pyridyl)ethylene (Fluka 43640, >98%), QT=quaterthiophene (synthesis description found in: W. M. Albers Finnish Pat. 095574 7.08.1995), DPHT=1,6-diphenyl-1,3,5-hexatriene (Fluka 43050, >99%) and PANI=polyaniline (Panipol Oy, Panipol-T, 4.6% solution in toluene).

The solvents used are: ethanol (Aa and Ba quality, Primalco, Finland) toluene (nanograde, Malinckrodt 8092), acetone (technical quality, Tamro, Finland), chloroform (HPLC quality, Baker 9174 or Malinckrodt 4443). In all examples, the matrix elastomer used is a styrene-ethene-butene-styrene copolymer (SEBS) compound. The silvered fibres are of type SF82TF8 and the spheres S 3000 S3N, manufacturer Potters Industries Inc. The silicone reference specimen is a typical silicone elastomer whose conductive filler is composed of silver-coated glass spheres.

EXAMPLE 1

The direct coating of molecular wires was studied by self-assembly on the surface of filler particles. As the molecular wire, the effect of BPD and DPE (Sagara et al, Langmuir 6, 254–262) on the resistivity values of the elastomer test specimens was tested. Electrically conductive elastomers of the invention were prepared, and the resistivity values of the test specimens made from them were measured. The effect of BTZ was also studied, since BTZ is known to be strongly adsorbed onto silver surfaces (S. Kapoor, Langmuir 14 (1998) 1021–1025, N. Shibata & S. Suzuki, J. Pat. 3158230, 1991).

Coating Filler Particles

Different compound combinations were diluted in 250 ml organic solvent in accordance with Table 1. The solution was added to 60 grams of silver-coated fibreglass particles. The slurry obtained was mixed for at least 1 hour at room temperature, and the slurry was then filtered in a Buchner funnel. The particles were rinsed three times carefully with a solvent, and then the particles were dried under a vacuum at a temperature of 80° C. The particles were stored in an exicator before the elastomer composite was prepared.

TABLE I

| Specimen No. | Compounds and amounts thereof/250 ml solvent and 60 g filler | solvent (adsorption phase/washing phase) |
|---|---|---|
| 1a | 1.5 g BPD | ethanol/ethanol |
| 1b | 1.5 g BPD + 0.5 g BTZ | ethanol/ethanol |
| 2a | 1 g DPE | ethanol/ethanol |
| 2b | 1 g DPE + 0.5 g BTZ | ethanol/ethanol |

Preparation of the Elastomer

The particles were mixed in a Brabender mixer into a SEBS compound at a temperature of 230° C. at a speed of rotation of 70 min$^{-1}$. The mixing was stopped when the mixing torque of the composite became constant. This took place after about 4 minutes of mixing. The content of the electrically conductive filler in the elastomer composite was 44 percent by volume.

Measurement of the Resistivity of the Elastomer Composite

Test specimens were made from the elastomer composites prepared in the above-described manner by compressing the composite between two hot mould plates in a mould cavity at a temperature of 230° C., and the preform obtained was then cooled under compression. The size of the preform was 3×6 cm and its thickness 2 mm. An actual test specimen was cut out of the preform, its size being 1×1 cm. The resistivities of the test specimens were measured by using a HP-4338B measuring device. The measuring signal used was 11 mV alternating current at a frequency of 1 kHz.

During measurement, the test specimens were arranged between two rectangular gold-coated electrodes. The compression of the test specimen was increased in steps using a torque wrench, the compressive force acting on the test specimen being 0, 5, 10, 15, 20, 25, 30 or 35 cNm. The thickness of the test specimen was measured after each increase of the compressive force. The resistivity of the test specimen was measured immediately before the following increase of the compressive force. The zero level of the resistance of the measurement was determined by shorting a circuit with a separate short-circuit wire while the test specimen was compressed between the electrodes. The short circuit was disconnected, and the resistance value was then read.

Results

Figure 2:
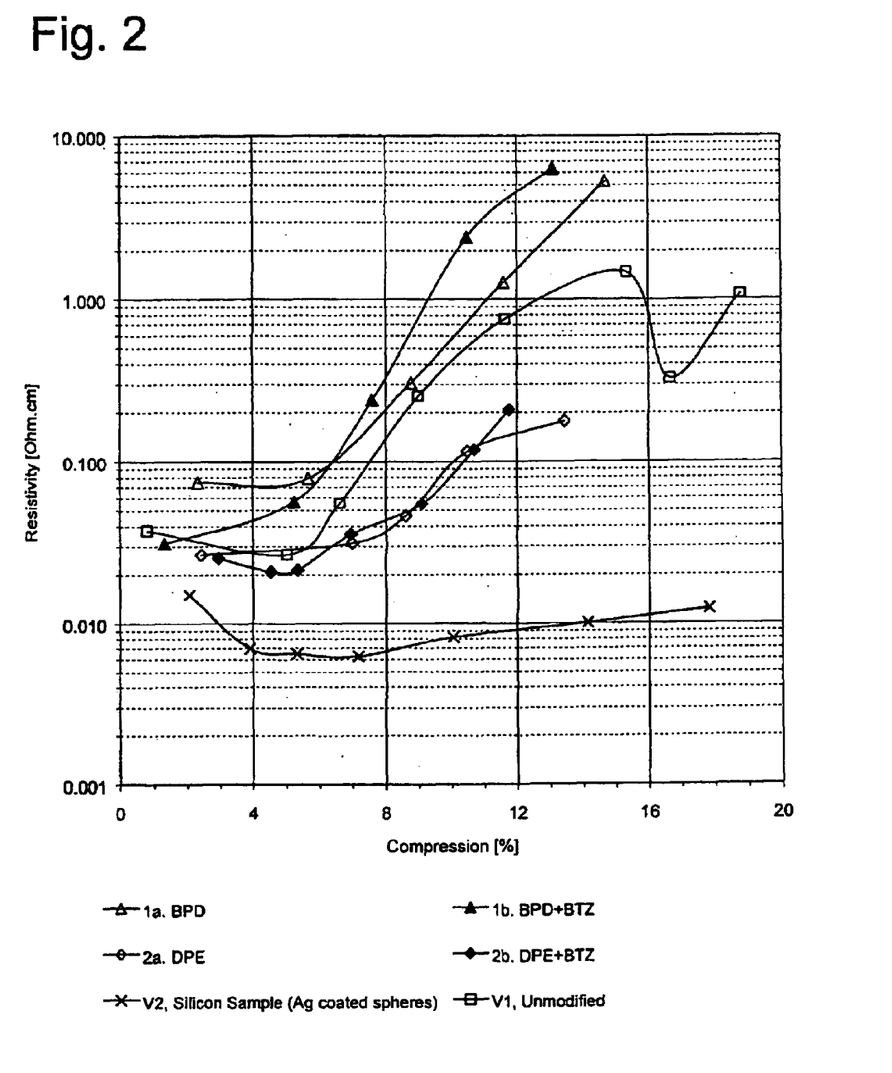

FIG. 2 shows the resistivity values of the test specimens as a function of the compression of the test specimen. The compression % represents the change in the thickness of the test specimen under compression relative to the thickness of a test specimen not under compression. The figure also shows the resistivity values of two reference test specimens made from prior art elastomer composites, measured as described above. The first reference test specimen 'V1, Unmodified' is made from a thermoplastic SEBS compound whose electrically conductive filler is silver-coated fibreglass particles, which are not treated in accordance with the invention. The second reference test specimen, 'V2, Commercial Specimen' is of a silicone elastomer. As FIG. 2 shows, as the compression increases, the resistivity of V1, representative of known thermoplastic technology, increases significantly. This is particularly the case when the compression is 5 to 6% or more. Instead, the resistivity of V2, made from a thermoset material, does not change much by the action of the compression, and its resistivity is the lowest of all measured test specimens over the entire compression range.

FIG. 2 shows that the self-assembly of BPD onto the surface of silver particles slightly impairs the resistivity values of the elastomer, whereas DPE improves the resistivity values of the elastomer as a function of the compression. The effect of BTZ is extremely slight in connection with BPD and in-significant in connection with DPE. Consequently, extremely short self-assembled aromatic compounds, i.e. extremely short molecular wires do not improve the electricity conductivity characteristics, but longer—at least 7 Å long—molecular wires operate substantially better.

EXAMPLE 2

In example 2, the effect of octadecylmercaptan ODM and different aromatic compounds on the resistivity values of prepared elastomer test specimens was studied. The fibrous filler particles were coated as in Example 1. The elastomer was prepared and the resistivity of the elastomer composite measured as in Example 1. The compounds used and their amounts are given in Table II.

TABLE II

| Specimen No. | Compounds and amounts thereof/250 ml solvent and 60 g filler | Solvent (adsorption phase/washing phase) |
|---|---|---|
| 3a | 1 g ODM | Toluene/toluene |
| 3b | 1 g ODM + 0.24 g QT)$^1$ | toluene/acetone |
| 4a | 1 g ODM | chloroform/chloroform |
| 4b | 1 g ODM + 0.5 g BTZ | chloroform/chloroform |
| 4c | 1 g ODM + 0.24 g QT)$^2$ | chloroform/chloroform |
| 4d | 1 g ODM + 0.24 g DPHT | chloroform/chloroform |
| 5a)° | 1 g ODM + 0.24 g DPHT | chloroform/chloroform |

Figure 3:
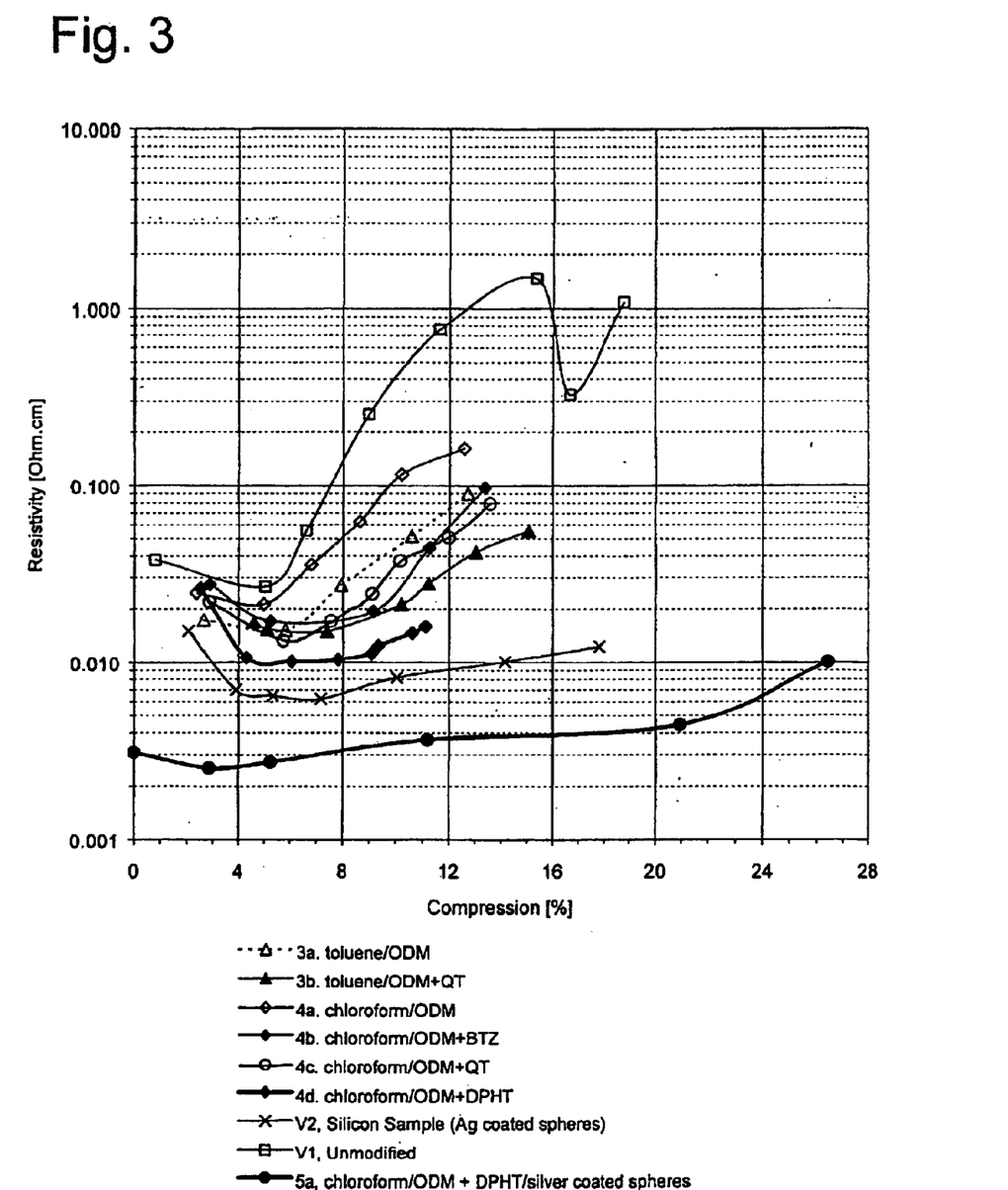

)$^1$QT was not completely dissolved,
)$^2$the solution had to be filtered,
)°silver-coated spheres Results FIG. 3 shows the resistivities of the elastomer composites according to Example 2. The resistivities of elastomer composites filled with silver fibre particles coated with only ODM (specimens 3a and 4a) are clearly lower than the resistivity of the reference specimen V1. The difference is evident at very low compressions and increases particularly when the compression exceeds 5 to 6%. The best resistivity values for composites coated with ODM are obtained for composite 3a, i.e. ODM dissolved in toluene. For example, at a 9% compression, the resistivity of 3a falls to about 14% and at a 12% compression to about 10% compared with the resistivity values of V1.

Composites 3b, 4b and 4c, i.e. ODM to which either QT or BTZ is bonded, yield resistivity values that are substantially lower than those of reference specimen V1, particularly at compressions exceeding 5 to 6%. Furthermore, their resistivity remains quite constant in the entire measured compression range. However, the best results are obtained with composite 4d and 5a, i.e. electrically conductive particles coated with ODM and with DPHT bonded thereto. Although the resistivity of composite 4d is still about double relative to reference specimen V2, its resistivity remains substantially constant in the compression range 4 to 10%. In the compression range below 4%, the resistivity first falls—as does that of reference specimen V2 and the other specimens. This is probably due to a falling contact resistance between the electrodes and the elastomer. When silver-coated spheres (50 percent by volume of the entire elastomer composite) are used instead of silver-coated fibres (specimen 5a), the behaviour of the resistivity by the action of compression changes substantially. Firstly, the resistivity is generally significantly lower than that of the commercial reference specimen V2, and the resistance values remain low at even very high compressions.

EXAMPLE 3

Example 3 deals with the effect of octadecylmercaptan ODM, dodecylmercaptan DDM and 1,6-diphenyl-1,3,5-hexatriene DPHT on the resistivity of elastomers. In these tests, coated spheres (50 percent by volume of the entire elastomer composite) are used instead of silver-coated fibres, and as solvent toluene, which has a better working safety than chloroform. Table III shows the compounds used. The filler particles were coated as in Examples 1 and 2, but the amount of substance was halved relative to the amount of filler. The elastomer was prepared and the resistivity of the elastomer composite was measured in the same way as in Examples 1 and 2.

TABLE III

| Specimen No. | Compounds and the amounts thereof/ 125 ml solvent and 60 g filler | solvent |
|---|---|---|
| 6a | 0.5 g ODM | toluene |
| 6b | 0.5 g ODM + 0.12 g DPHT | toluene |
| 7a | 0.5 g DDM | toluene |
| 7b | 0.5 g DDM + 0.12 g DPHT | toluene |

Results

Figure 4:
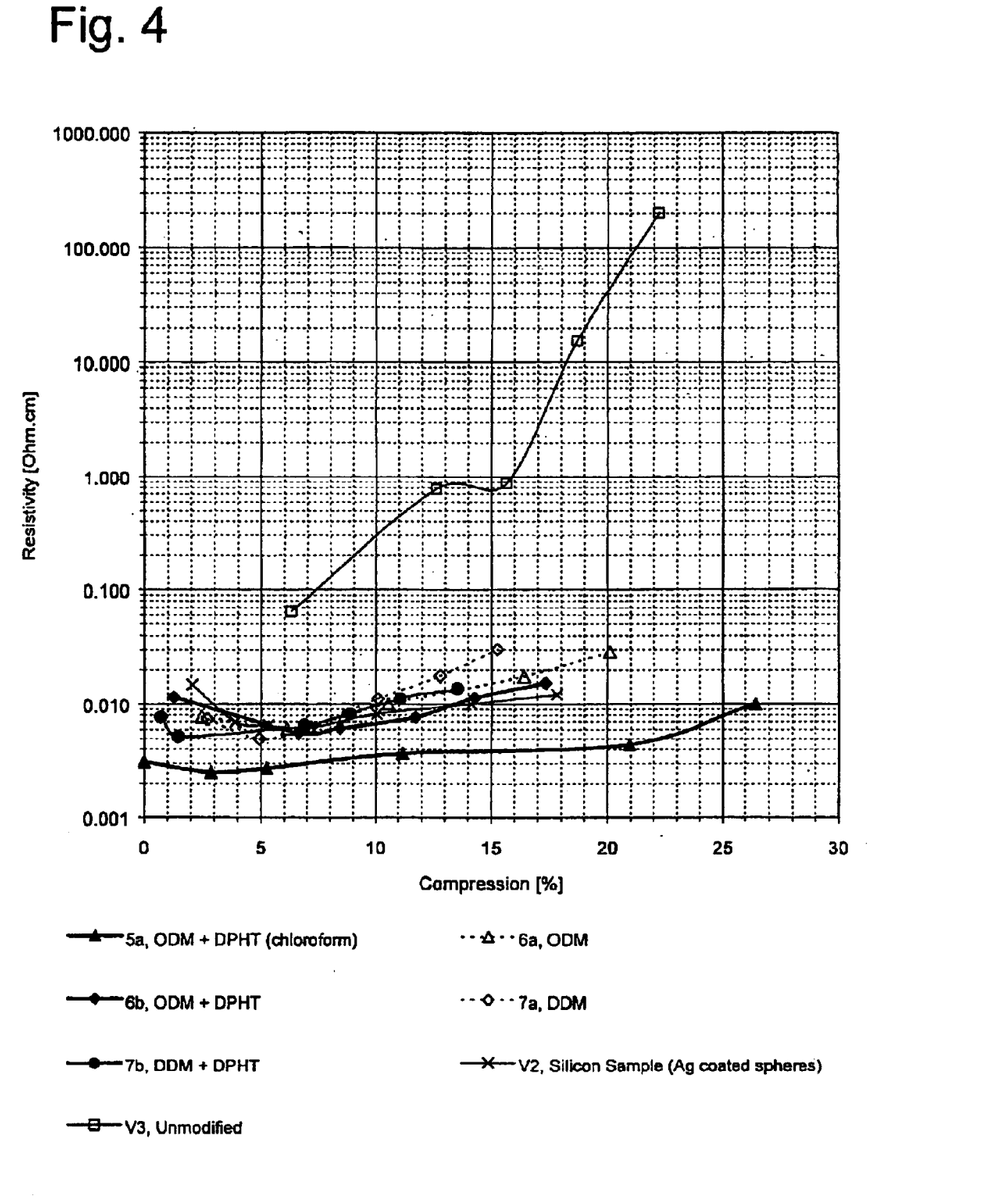
FIG. 4 schematically shows the resistivities of third test specimens made from electrically conductive elastomer composites of the invention and test specimens made from prior art elastomer composites as a function of the compression of the test specimen, and FIG. 5 schematically shows the resistivities of fourth test specimens made from electrically conductive elastomer composites of the invention and test specimens made from prior art elastomer composites as a function of the compression of the test specimen.

FIG. 4 shows the resistivity values of the different elastomer composites as a function of compression. Specimen 5a (Table II) gives a significantly lower resistivity than the commercial reference specimen V2, whereas changing the solvent and halving the amounts of self-assembled compounds yields resistivity values that are almost equal to those of reference specimen V2. In this case, the effect of DPHT is only very slight, and DDM yields almost the same results as ODM.

EXAMPLE 4

In Example 4, the effect of ODM and polyaniline PANI on the resistivity values of elastomers was studied. Different filler specimens were prepared in accordance with Table IV. The filler particles were coated, the conductive elastomer prepared and the resistivity of the elastomer composite measured as in Example 3. The preparation of polyaniline is described for instance in article Y. Cao et al, Synth. Met. 55–57 (1993) 3514–3519.

TABLE IV

| No. | Compounds and amounts thereof | solvent |
|---|---|---|
| 6c1 | 0.5 g ODM + 0.12 g PANI | toluene |
| 6c2 | 0.12 g PANI | toluene |
| 6c3 | 0.5 g ODM + 0.12 g PANI)* | toluene |
| 6c4 | 0.5 g ODM + 0.12 g PANI)** | toluene |

)*particles first mixed for 1½ hours with ODM, then PANI was added and mixing was continued for 3 hours.
)**particles first mixed for 1½ hours with ODM, then PANI was added and mixing was continued for ½ hours.

Results

Figure 5:
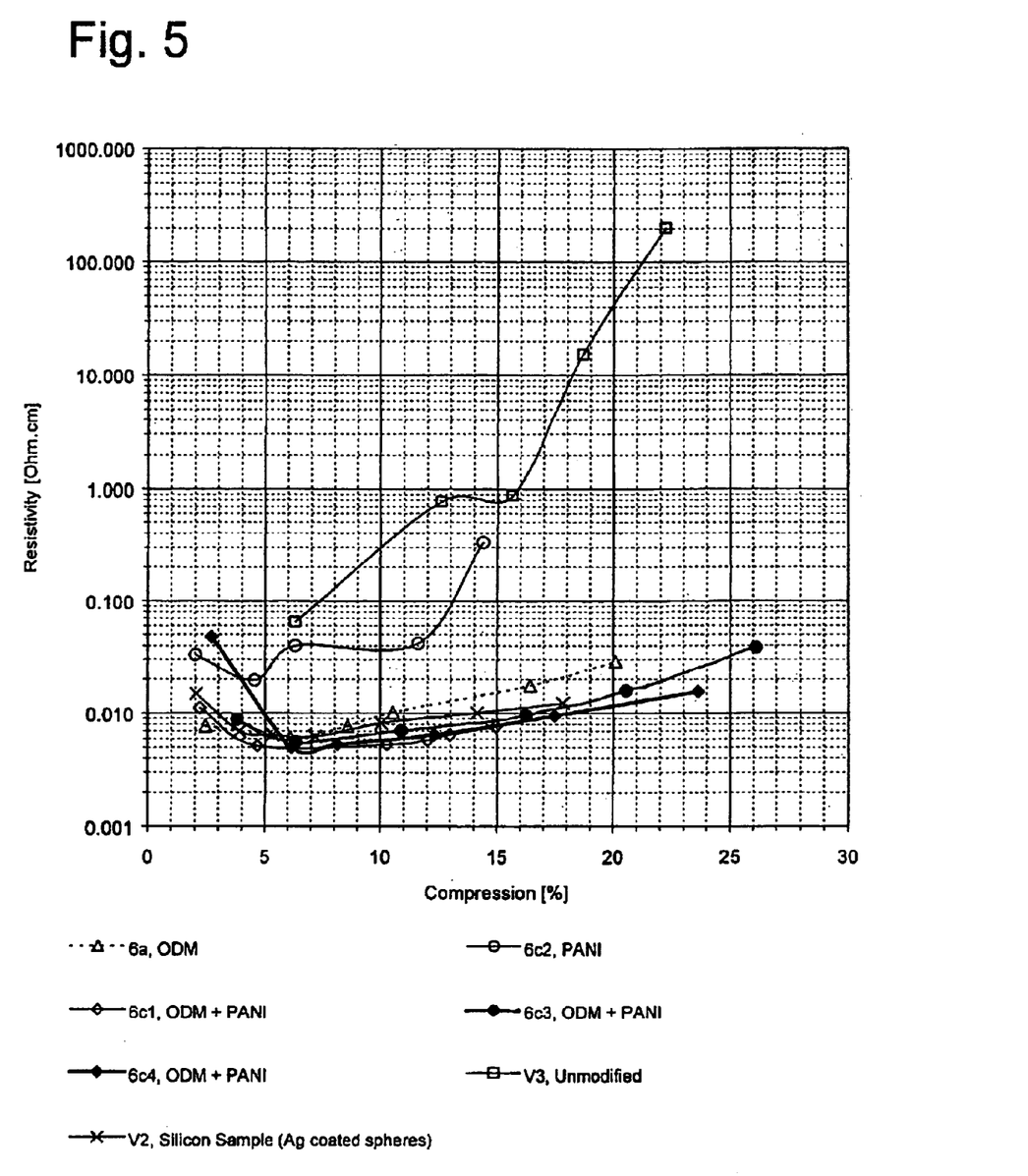

FIG. 5 shows the resistivity curves of the elastomer composites prepared in accordance with Table IV. The precipitation of polyaniline PANI, specimen 6c2, on the surface of spherical particles lowers the resistivity to some degree as compared with reference specimen V3, but the effect of compression is significant. The effect of ODM alone, specimen 6a, Table III, is substantially more significant and provides resistivities that are nearly equal to those of reference specimen V2, whose resistivity is only slightly affected by increased compression. When PANI and ODM are simultaneously precipitated on the surface of silver spheres, specimen 6c1, the resistivity falls slightly lower, below the commercial reference specimen V2. Quite similar results are obtained by coating the silver spheres first with ODM and adding PANI 1½ hours later.

Conclusions

According to a simple model, the resistance ($R_c$) of an electrically conductive composite is composed of five factors (G. R. Ruschau et al, J. Appl. Phys. 72 (1992) 953–959):
1. resistance ($R_e$) between external electrodes and the composite,
2. resistivity ($R_i$) of filler particle,
3. inter-filler particle contact resistance ($R_p$),
4. (average) number of particles in conductive chain (M),
5. number (N) of conductive chains In this case, the resistance of the composite, where the matrix itself is not electrically conductive, can be given by the following equation:

$$R_c = 2R_e + \frac{(M-1)R_p + MR_i}{N} \qquad (2)$$

The resistivity of the filler particle can be affected by choice of matrix and filler. Contact resistance (and chaining) can be affected by changing the characteristics of the surface of the filler particles. The first important phenomenon is contact resistance. When the substance between the filler particles is a dielectric, in practice, contact resistance is determined according to the tunnelling resistance. The tunnelling of electrons is efficient when the particles are nearer each other than about 8 nm. Further, tunnelling is affected by the characteristics of the interparticle substance, including the potential barrier, which is determined according to the thickness and dielectric constant of the substance. Coating silver particles with a self-assembled monomolecular layer allows this resistance to be lowered in at least three manners: (1) the oxide layer can be replaced with a sulphide layer that has a better conductivity, and (2) the layer (alkyl chain) significantly lowers the potential barrier, which enhances the tunnelling of the electron also over longer distances, and (3) the long alkyl chain decreases the surface potential and the surface resistance, whereby the particles generate chains inside the matrix polymer by means of weak van-der-Waals attractions.

Patent application JP-298683 describes the combined effect of mercaptans, benzotriazole and paraffin in lowering the contact resistance of silver surfaces, preventing corrosion, and maintaining a low surface sliding resistance. Instead, in coating silver particles used in elastomer composites, the combined effect of at least benzotriazole and mercaptan in lowering contact resistance is not very significant: mercaptan itself is sufficiently effective in lowering contact resistance to a suitable level and in minimizing the effect of compression forces. In contrast, the contact resistance falls significantly when neutral molecular wires are added during the self-assembly process.

Although the effective mechanism of ODM is so far unclear particularly on a theoretical level, in empirical tests it has been found to substantially lower the resistivity of an elastomer composite particularly in specimens subjected to compressive forces. Compressive forces act to some degree on the chains formed by all particles, i.e. values M and N in the equation and the average distance between the particles in the electrically conductive chains. Measurements show that when the intraparticle contact resistance is lowered only by the action of the non-conductive alkylmercaptan, compressive forces do not either act very strongly any more. This may mean that the tunnelling of the electrons by the action of the coating also improves when the distance between the electrically conductive particles increases.

Oligomeric molecular wires and electrically conductive polymers can be bonded to ODM and further lower the resistivity of a particle. In this case, the contact resistance may be determined more according to the conductivity of the molecular wires than the tunnelling process. This also results in the compression curves being still more evened out.

The examples and the related specification are only intended to illustrate the inventive idea. The details of the invention may vary within the scope of the claims. Accordingly, the invention is naturally not restricted to the composites described in the attached examples. The basic form of a particle in the conductive filler may be for instance a sphere, a square, a flake, a fibre or any other particle form known per se. The filler may also comprise two or more different particle forms. The filler particle may be entirely of a conductive material or it may consist of particles coated with a conductive material. The conductive filler may be of another metal than silver, such as iron, copper, nickel, chromium, gold, platinum or palladium. A composite of two or more conductive fillers may also be applied. The content of the conductive filler in the elastomer composite may naturally vary within limits known per se.

The elastomer matrix may be composed of not only one, but also two or more polymer material phases, at least one of which is a continuous phase, i.e. the matrix may have an IPN structure (Interpenetrating Polymer Networks). Such structures are described for instance in U.S. Pat. No. 5,844,037, international patent application WO 9941304, EP patent application 0 272 541, EP patent application 0 718 350 and EP patent application 0 581 541. In an IPN matrix, the electrically conductive filler is mixed with a continuous polymer material phase.

What is claimed is:

1. An electrically conductive thermoplastic elastomer composite comprising an elastomer matrix and metal-containing particles as an electrically conductive filler, wherein the electrically conductive particles are at least partly coated with a self-assembled monomolecular layer whose molecules correspond to the general structure 1:

$$X-(CH_2)_n-CH_3 \qquad (1)$$

where X is a neutral end group capable of forming a stable complex with the metal surface.

2. The thermoplastic elastomer composite of claim 1, wherein X is mercaptan (SH), 4-pyridine or phosphine.

3. The thermoplastic elastomer composite of claim 1, wherein n in the general structure 1 is between 9 and 19.

4. The thermoplastic elastomer composite of claim 1, wherein neutral molecular wires are arranged in the self-assembled monomolecular layer.

5. The thermoplastic elastomer composite of claim 4, wherein the length of said molecular wires is between 7 and 21 Å.

6. The thermoplastic elastomer composite of claim 4, wherein said molecular wires are quaterthiophene (QT) or diphenyihexatriene (DPHT) molecules.

7. The thermoplastic elastomer composite of claim 1, wherein an electrically conductive polymer is arranged in the self-assembled monomolecular layer.

8. The thermoplastic elastomer composite of claim 7, wherein the electrically conductive polymer is polyaniline (PANI), polypyrrol and/or polythiophene.

9. The thermoplastic elastomer composite of claim 1, wherein the elastomer matrix comprises at least two polymer phases.

10. The thermoplastic elastomer composite of claim 1, wherein it comprises a styrene-ethene-butene-styrene copolymer (SEBS).

* * * * *